Feb. 12, 1963 R. E. WATKINS 3,077,293

PRESSURE ROLLER ASSEMBLY FOR RECORDING MEDIA

Filed May 16, 1960

INVENTOR.
Robert E. Watkins

BY

Hovey, Schmidt, Johnson & Hovey
ATTORNEYS.

3,077,293
PRESSURE ROLLER ASSEMBLY FOR RECORDING MEDIA

Robert E. Watkins, Tulsa, Okla., assignor, by mesne assignments, to Midwestern Instruments, Inc., Tulsa, Okla., a corporation of Oklahoma
Filed May 16, 1960, Ser. No. 29,459
8 Claims. (Cl. 226—186)

Figure 1:
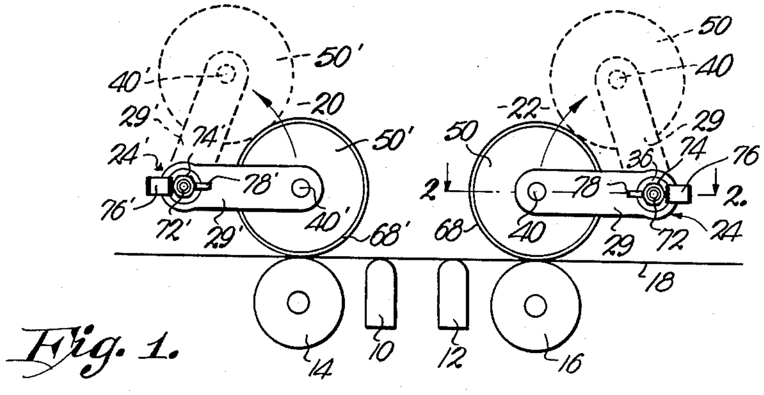

This invention relates to a tape-drive assembly for use in connection with recorders and the like, the primary object being to provide a novel pressure roller assembly operable in connection with a capstan and cooperating therewith to advance the tape, the pressure roller itself being driven by the capstan by an operable association therewith such that rotative motion is applied to the roller from the capstan by means separate from, and in addition to, power inherently supplied to the friction roller by virtue of the tape being gripped between the capstan and the roller.

It is the most important object of the present invention to provide a pressure roller assembly that is especially advantageous for use in connection with digital tape transports and the like wherein the magnetic tape must be brought from rest to a high speed as quickly as possible and be stopped almost instantaneously, all in response to certain electrical signals or other controls forming a part of the machine and to which the power supply means for the capstans are sensitive.

Another important object of the instant invention is to provide a novel means for clamping the tape against the capstan that is highly responsive to the aforementioned signals and sensitive to fluid pressure changes used as the actuating means therefor.

In the drawing:

FIGURE 1 is a schematic elevational view illustrating a pair of pressure roller assemblies for a recording media embodying the present invention.

Figures 2, 3:
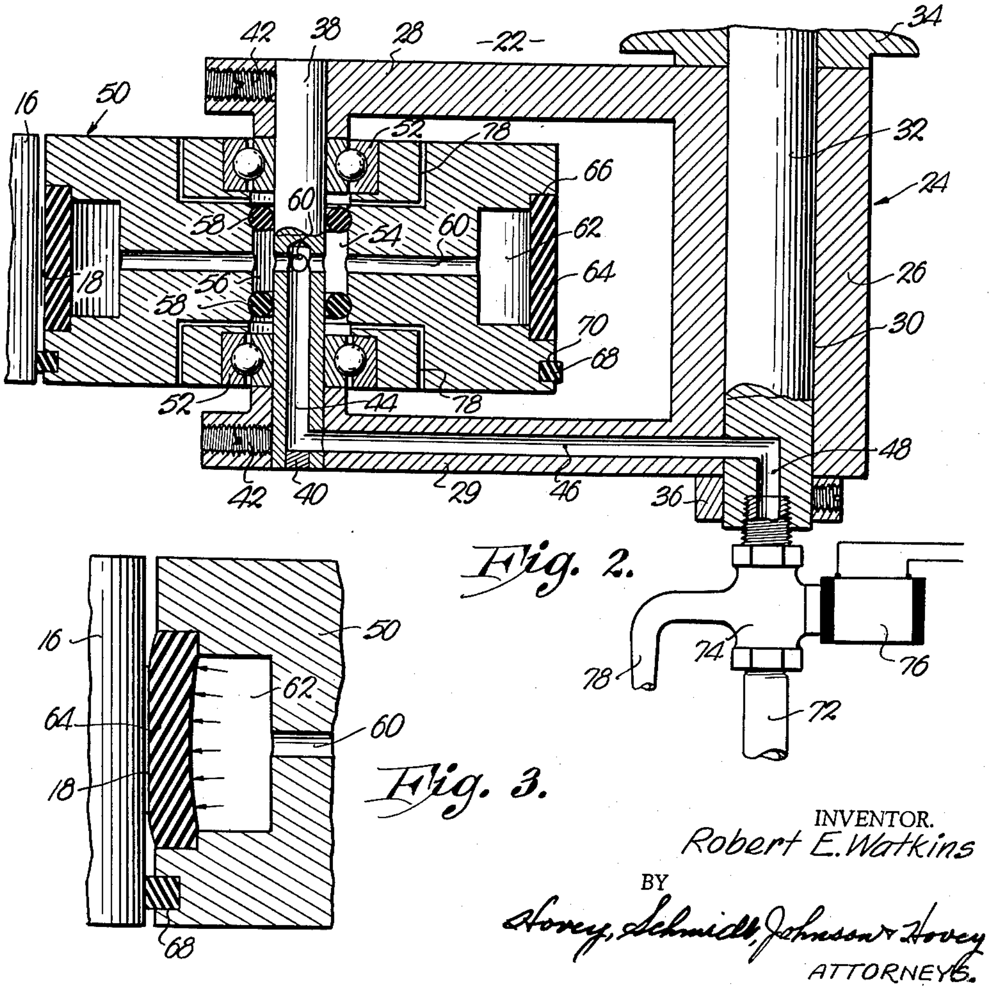

FIG. 2 is an enlarged, fragmentary, horizontal cross-sectional view taken on line 2—2 of FIG. 1, but for purposes of illustration, showing a portion of an associated capstan and the tape between the capstan and the pressure roller; and FIG. 3 is a fragmentary, cross-sectional view still further enlarged and similar to FIG. 2, illustrating the operable gripping of the tape between the capstan and the roller.

The principles of the instant invention have been illustrated fragmentarily in FIG. 1 in connection with a digital tape transport with which the improvements may be used, and to this end, a pair of magnetic heads 10 and 12 are shown disposed between a pair of capstans 14 and 16 with magnetic tape 18 overlying the elements 10, 12, 14 and 16.

A pair of assemblies 20 and 22 for capstans 14 and 16 respectively, overlie the tape 18 and since they are identical, reference may be had to FIGS. 2 and 3 with respect to a more detailed description of the assembly 22. It includes a U-shaped yoke 24 having a bight 26 and a pair of parallel legs 28 and 29 integral with, and extending laterally from, the bight 26. A bore 30 through the bight 26 receives a shaft 32 carried by any suitable frame support 34 forming a part of the machine. A set collar 36 on the shaft 32 holds the yoke 24 in place.

A shaft 38 passes through the legs 28 and 29 adjacent the terminal ends thereof and is releasably held in place by setscrews 42. Shaft 38 has an L-shaped bore 44 plugged as at 40 and communicating at one end thereof with a longitudinal fluid passage 46 in the leg 29. One end of the passage 46 normally communicates directly with an L-shaped passage 48 formed in the shaft 32 adjacent the set collar 36.

A pressure roller, broadly designated by the numeral 50, is journalled on the shaft 38 between the legs 28 and 29 through use of bearings 52 having a press fit connection with roller 50. Bores 54 and 56 in roller 50 concentric with shaft 38 receive O-ring seals 58 that surround the shaft 38. A number of central fluid-receiving chambers 60 in roller 50 extend through shaft 38 and communicate with the bores 54 and 56 and, therefore, with the proximal inner end of the bore 44 which they intersect. Chambers 60 also communicate with a peripheral groove 62 in the roller 50 that is in turn surrounded by an expansible device in the nature of an annular band 64 of frictionable resilient material such as rubber, the band 64 being seated within a peripheral cavity 66 in the roller 50 and being bonded tightly in place.

An annular peripheral friction ring 68 of resilient material surrounds the roller 50 and is seated within groove 70, the ring 68 normally engaging the capstan 16 alongside the tape 18 which is in turn disposed between capstan 16 and band 64.

The passage 48 may be coupled with a source of fluid pressure (not shown) such as air, through a supply line 72 having a cutoff valve 74 interposed therein and which may be electrically controlled if desired, through use of a solenoid 76 or other electrical actuator.

As is apparent in FIG. 1, the yoke 24 is vertically swingable about the horizontal axis of the shaft 32; hence, the inherent weight of the assembly 22 normally maintains the ring 68 in driving engagement with the capstan 16. However, even when slightly compressed by such weight, the ring 68 projects outwardly beyond the peripheral surface of the roller 50 sufficiently to normally provide a clearance between the capstan 16 and the band 64 so that capstan 16 may be driven in either direction continuously without advancing tape 18. The swingable mount for the yoke 24 is advantageous additionally because the rollers may be swung upwardly to the dotted line position shown in FIG. 1, thereby facilitating handling of the tape 18 when it is to be placed on the capstans 14 and 16, or removed therefrom.

The electrical control 76 for the valve 74, may be coupled in the electrical system of the machine such as to be sensitive to certain signals, and when it causes opening of the valve 74, the fluid pressure passes from the supply line 72 to the passage 48, the passage 46, the bore 44, the chambers 60 and into the groove 62. This has the effect of expanding the band 64 in the manner illustrated in FIG. 3 to quickly bring it into engagement with the tape 18 and to clamp the latter against the capstan 16. As soon as the pressure in the groove 62 is relieved, by actuating valve 74 to vent the air pressure to atmosphere via pipe 78, band 64 returns to its normal shape as shown in FIG. 2, and the tape 18 comes to rest. The release of the band 64 from the tape 18 may be augmented, if desired, by coupling pipe 78 to suitable suction means (not shown) so that the pressure in groove 62 is brought below atmospheric pressure.

It is desirable to provide vents 78 in the roller 50 to discharge fluid leakage past the seals 58 to atmosphere, so that foreign matter that happens to be in the fluid pressure medium will not enter the bearings 52 and have deleterious effect upon the free rotation of the roller 50.

The components of the assembly 20 are designated in FIG. 1 with respect to the assembly 22, through use of the same numerals accompanied by a prime designation.

Having thus described the invention what is claimed as new and desired to be secured by Letters Patent is:

1. In combination with a rotatable, tape-driving capstan, a pressure roller provided with a pair of opposed faces and having a peripheral groove intermediate and spaced from said faces, the capstan and the roller being adapted to receive a tape therebetween; a resilient band of frictionable material surrounding the groove in overlying relationship thereto; means for directing a fluid pressure into the groove to expand the band and thereby clamp the tape against the capstan; and means operably coupling the roller to the capstan for rotation of the roller by the capstan, said coupling means being independent of said band of frictionable material.

2. In combination with a rotatable, tape-driving capstan, a pressure roller provided with a peripheral groove and a peripheral friction ring engaging the capstan for rotation of the roller by the capstan, the capstan and the roller being adapted to receive a tape therebetween; a resilient band of frictionable material surrounding the groove; and means for directing a fluid pressure into the groove to expand the band and thereby clamp the tape against the capstan.

3. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan.

4. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan, including a yoke embracing the roller and rotatably mounting the same, and means swingably supporting the yoke.

5. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan, including a yoke embracing the roller and rotatably mounting the same, and means swingably supporting the yoke, the yoke having a fluid passage communicating with the groove.

6. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan, including a yoke embracing the roller and rotatably mounting the same, and means swingably supporting the yoke, the roller having a fluid-receiving chamber therewithin communicating with the groove, the yoke having a fluid passage communicating with the chamber.

7. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan, including a yoke embracing the roller and having means including a tube rotatably mounting the same, and means swingably supporting the yoke, the roller having a fluid-receiving chamber therewithin communicating with the tube and with the groove, the yoke having a fluid passage communicating with the tube.

8. In combination with a rotatable, tape-driving capstan, a pressure roller provided with a peripheral groove and a peripheral friction ring normally engaging the capstan for rotation of the roller by the capstan, the capstan and the roller being adapted to receive a tape therebetween; a resilient band of frictionable material surrounding the groove; means for directing a fluid pressure into the groove to expand the band and thereby clamp the tape against the capstan; and means supporting the roller for movement toward and away from the capstan, including a yoke embracing the roller and having means including a tube rotatably mounting the same, and a shaft swingably supporting the yoke and provided with a fluid-receiving passage, the roller having a fluid-receiving chamber therewithin communicating with the tube and with the groove, the yoke having a fluid passage communicating with the tube and normally with the passage in the shaft.

References Cited in the file of this patent

UNITED STATES PATENTS

| | | |
|---|---|---|
| 2,520,126 | Collard | Aug. 29, 1950 |
| 2,679,800 | Lofquist | June 1, 1954 |
| 2,987,233 | Selsted | June 6, 1961 |

FOREIGN PATENTS

| | | |
|---|---|---|
| B. 26,081 | Germany | Aug. 23, 1956 |